(12) United States Patent
Bhattacharya et al.

(10) Patent No.: US 10,872,103 B2
(45) Date of Patent: Dec. 22, 2020

(54) RELEVANCE OPTIMIZED REPRESENTATIVE CONTENT ASSOCIATED WITH A DATA STORAGE SYSTEM

(71) Applicant: HEWLETT PACKARD ENTERPRISE DEVELOPMENT LP, Houston, TX (US)

(72) Inventors: Suparna Bhattacharya, Bangalore (IN); Douglas L. Voigt, Boise, ID (US); Sandya Mannarswamy, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 307 days.

(21) Appl. No.: 15/761,991

(22) PCT Filed: Mar. 10, 2016

(86) PCT No.: PCT/US2016/021653
§ 371 (c)(1),
(2) Date: Mar. 21, 2018

(87) PCT Pub. No.: WO2017/078774
PCT Pub. Date: May 11, 2017

(65) Prior Publication Data
US 2018/0276290 A1    Sep. 27, 2018

(30) Foreign Application Priority Data
Nov. 3, 2015    (IN) .......................... 5949/CHE/2015

(51) Int. Cl.
*G06F 7/02*    (2006.01)
*G06F 16/00*    (2019.01)
(Continued)

(52) U.S. Cl.
CPC .......... *G06F 16/285* (2019.01); *G06F 16/345* (2019.01); *G06F 16/2465* (2019.01)

(58) Field of Classification Search
CPC .... G06F 16/285; G06F 16/345; G06F 16/245; G06F 16/9535; G06F 16/9532;
(Continued)

(56) References Cited

U.S. PATENT DOCUMENTS 7,600,198 B2    10/2009    Gunderson et al.
2003/0046270 A1    3/2003    Leung et al.
(Continued)

FOREIGN PATENT DOCUMENTS

CN    102004670 A    4/2011
CN    102292699 A    12/2011
(Continued)

OTHER PUBLICATIONS

Extended European Search Report received in EP Application No. 16862610.9 dated Mar. 1, 2018, 12 pages.
(Continued)

*Primary Examiner* — Bruce M Moser
(74) *Attorney, Agent, or Firm* — Hewlett Packard Enterprise Patent Department

(57) ABSTRACT

Relevance optimized representative content associated with a data storage system is disclosed. One example is a system including a data summarization module, a clustering module, and a representative content selection module. The data summarization module associates, via a processor, each data object in a storage system with a derived data object. The clustering module determines clusters of similar data objects based on a similarity between associated derived data objects, and selects a representative data object for each determined cluster. The representative content selection module selects representative content associated with the
(Continued)

storage system, where the representative content is based on the data objects, the derived data objects, and the representative data objects, and relevance optimizes of the selected representative content to an analytics application.

14 Claims, 4 Drawing Sheets

(51) Int. Cl.
  *G06F 16/28*      (2019.01)
  *G06F 16/34*      (2019.01)
  *G06F 16/2458*    (2019.01)

(58) Field of Classification Search
  CPC .... G06F 16/252; G06F 16/00; G06F 16/2462; G06F 16/2465
  See application file for complete search history.

(56) References Cited

U.S. PATENT DOCUMENTS

| | | | |
|---|---|---|---|
| 2007/0112852 A1 | 5/2007 | Sorvari et al. | |
| 2008/0077572 A1 | 3/2008 | Boyle et al. | |
| 2009/0248722 A1 | 10/2009 | Pikovsky et al. | |
| 2009/0249340 A1* | 10/2009 | Akiyama | G06Q 10/10 718/100 |
| 2011/0137924 A1 | 6/2011 | Hunt et al. | |
| 2012/0117116 A1 | 5/2012 | Jacobson et al. | |
| 2014/0059017 A1 | 2/2014 | Chaney et al. | |
| 2014/0280146 A1* | 9/2014 | Wood | G06F 16/285 707/737 |
| 2015/0134694 A1* | 5/2015 | Burke | G06Q 10/06398 707/769 |
| 2016/0092557 A1* | 3/2016 | Stojanovic | G06F 16/254 707/723 |
| 2018/0095952 A1* | 4/2018 | Rehal | G06F 16/288 |

FOREIGN PATENT DOCUMENTS

| | | |
|---|---|---|
| CN | 102682059 A | 9/2012 |
| CN | 103477243 A | 12/2013 |
| WO | WO-2015147913 A1 | 10/2015 |

OTHER PUBLICATIONS

International Search Report & Written Opinion received in PCT Application No. PCT/US2016/021653, dated Jul. 28, 2016, 8 pages.

Rocket Software, Inc., "Intelligent Data Management Required When Implementing a Modern Storage Infrastructure," Sep. 2014, 28 pages, http://cognitiveimpact.com/media/technicalpapers/WP_Arkivio_Arkivio_Autostor.pdf.

Manyika J. et al., "Big Data: The Next Frontier for Innovation, Competition, and Productivity," McKinsey & Company, May 2011, 156 pages.

SAS Institute Inc., "SAS® Visual Analytics for UN Comtrade," (Web Page), retrieved online Aug. 4, 2015, 9 pages, available at http://www.sas.com/en_us/software/visual-analytics-comtrade.html.

Zhang, J. et al., "Impression Store: Compressive Sensing-based Storage for Big Data Analytics," 2014, 6 pages, https://www.usenix.org/system/files/conference/hotcloud14/hotcloud14-zhang_jiaxing.pdf.

Sengupta, A. et al., "Semantic Thumbnails—A Novel Method for Summarizing Document Collections," ACM, 2004, 7 pages, available at https://www.researchgate.net/profile/Mehmet_Dalkilic/publication/220961546_Semantic_thumbnails_a_novel_method_for_summarizing_document_collections/links/0deec533eb5001ffba000000.pdf.

Dan Baker, "When Big Data is Too Big: The Value of Real-Time Filtering and Formatting," interview with Rick Aguirre, available online at <http://bswan.org/big_data_too_big.asp>, Aug. 2013, pp. 1-3.

European Patent Office, Communication pursuant to Article 94(3) EPC received for EP Patent Application No. 16862610.9, dated Feb. 18, 2019, pp. 1-9.

Palguna et al., "Analysis of Sampling Algorithms for Twitter," Twenty-Fourth International Joint Conference on Artificial Intelligence, Jun. 2015, pp. 967-973.

\* cited by examiner

RELEVANCE OPTIMIZED REPRESENTATIVE CONTENT ASSOCIATED WITH A DATA STORAGE SYSTEM

BACKGROUND

Data from a storage system may be accessed by a variety of analytics applications. For example, an analytics application may access data to respond to an analytics query. Generally, different analytics applications may access different collections of data in the storage system.

DETAILED DESCRIPTION

Figure 1:
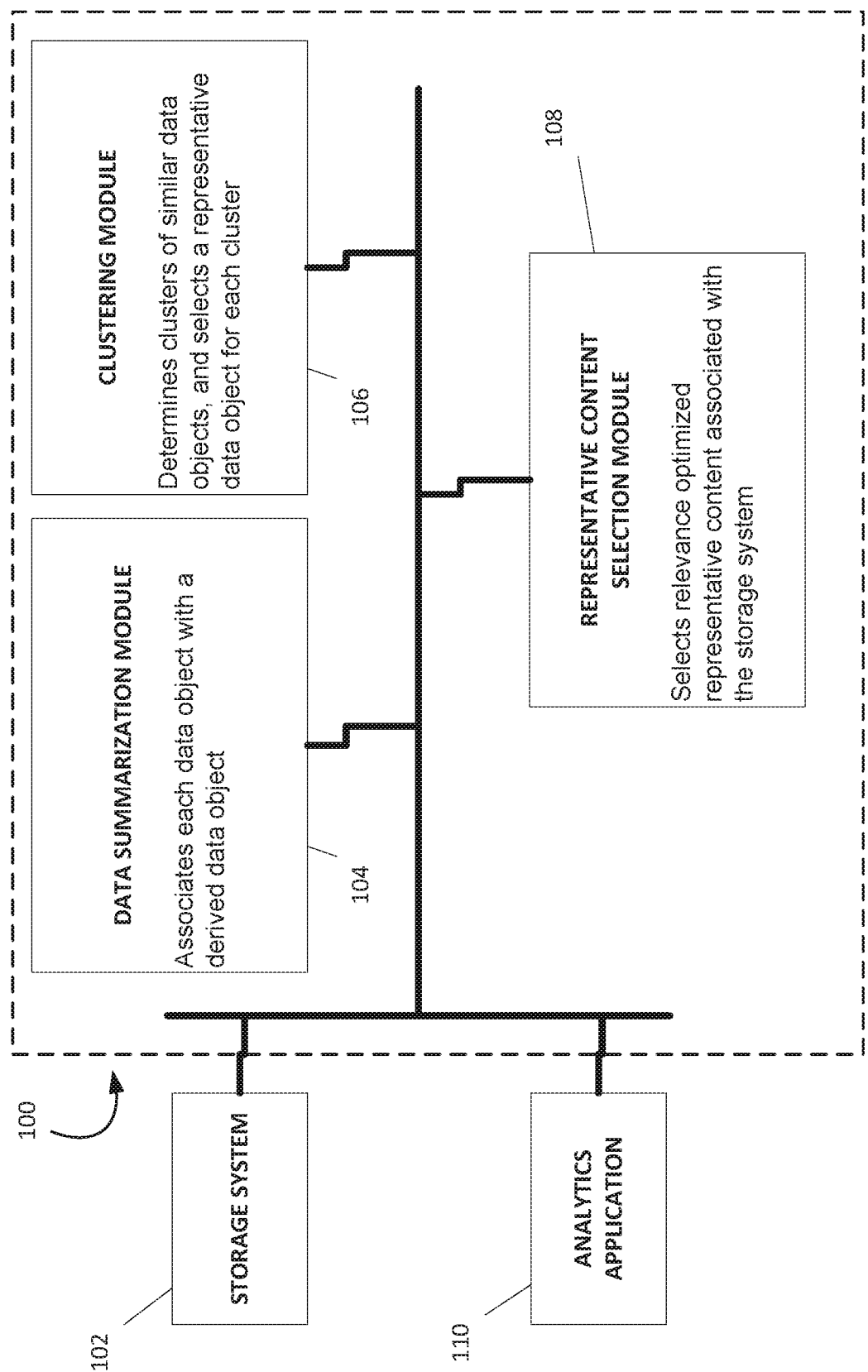
FIG. 1 is a functional block diagram illustrating one example of a system for relevance optimized representative content associated with a data storage system.

High volume of data generated by interconnected devices (such as mobile devices) and instrumentation sources (e.g. sensors) presents rich opportunities for discovering new insights. At the same time, such data also creates challenges of growing costs incurred in storage, analytic processing and data communication. Often such costs tend to be disproportionately high compared to the percentage of information content that turns out to be relevant for producing valuable insight. Generally, accumulated data lands in traditional storage systems which may not be able to distinguish data that is potentially relevant to analytics workflows, from much of the detailed content that may be irrelevant for such purposes. This may lead to an inefficient use of storage, as well as unnecessary data transfers. In some instances, there may be additional processing costs, and/or intermediate data generation within consumers, which in turn may affect the timeliness of actionable conclusions.

Although application specific pre-filtering, sampling, aggregation and summarization (including use of data clustering to identify representatives) are typically employed within big data analytics applications by data scientists, this may be too late in the workflow to optimize storage management and data transfer costs.

Accordingly, there is a need for a relevance-optimized storage system that transparently attempts to efficiently serve and maintain "representative" data. The "representative" data may be selected to relevance optimize for an analytics workload. The term "relevance optimize" as used herein, generally refers to representing the data to a degree of granularity that has an optimal relevance for a given analytics application. In some examples, the optimal relevance may include a maximal representation of the data. In some examples, the optimal relevance may include an approximate representation of the data. As another example, the optimal relevance may include the entire data.

In some examples, an approximation granularity that preserves representative properties may be automatically learned based on pre-querying the fidelity of results obtained for a sample analytics query. Generally, as described herein, the system maintains derived data objects, utilizes similarity to cluster data objects in the storage system based on the derived data objects, and derives a representative data object from each cluster. A representative data object may be selected based on comparisons based on similarity and variations over the entire content. In some examples, the system may automatically provide such relevant representative data objects in response to subsequent data access requests from analytics consumers, instead of returning all the objects and/or data present in the accessed container/directory. In some examples, all the objects/data present in the accessed container and/or directory may be provided if they are likely to add significant relevant information.

As described in various examples herein, relevance optimized representative content associated with a data storage system is disclosed. One example is a system including a data summarization module, a clustering module, and a representative content selection module. The data summarization module associates, via a processor, each data object in a storage system with a derived data object. The clustering module determines clusters of similar data objects based on a similarity between associated derived data objects, and selects a representative data object for each determined cluster. The representative content selection module selects representative content associated with the storage system, where the representative content is based on the data objects, the derived data objects, and the representative data objects, and relevance optimizes of the selected representative content to an analytics application.

Generally, the system disclosed herein, is able to transparently identify, manage and serve relevant data from the storage system, where the data may have very limited context on the analytic workload. The derived data objects generally capture aggregate characteristics in the data to help reduce redundant information and may be customized by data type. The representative data objects generally capture sufficient variability details to enable insight discovery at a granularity that may be tuned for a given analytics workload type.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for relevance optimized representative content associated with a data storage system. System 100 includes a data summarization module 104, a clustering module 106, and a representative content selection module 108. The data summarization module 104 may associate, via a processor, each data object in a storage system 102 with a derived data object. As used herein, the storage system may be any file-based system with data storage capabilities, where the data objects may be electronically accessible to system 100 via the processor. In some examples, the storage system 102 may be an object-based store. Generally, the data objects may be available for use by a plurality of potential analytics applications.

The derived data object associated with the data object is generally a summary and/or representation of the data object itself, and/or may provide insights about the data object obtained via some form of analytic processing. In some examples, as data objects are stored in the storage system 102, custom derived data objects may be generated either immediately or via an offline processing system. The derived data object may be stored and associated with the original data object from which it is derived.

In some examples, the derived data object may be a data thumbnail of the associated data object. For example, the data thumbnail may be generated from semantic content of documents. In some examples, the derived data object may be an analysis summary of the associated data object. For example, a derived data object associated with a log file may represent statistical characteristics (e.g., count, average, min, max, variance, histograms or characteristics obtained via more involved time series analysis) of log messages, fields and values. In some examples, the derived data object may be a content summary of the associated data object. For example, a derived data object associated with a system log may include anomaly and/or severity labels. Also, for example, a derived data object associated with a document may include its meta-data description, word counts, key phrases and/or topic distributions. In some examples, the topic distributions may require an offline/background analysis to learn the topic model. As another example, a derived data object associated with online reviews (of products, movies, restaurants etc.) may include sentiment labels and/or vectors generated by performing a sentiment analysis of the text.

System 100 includes the clustering module 106 to determine clusters of similar data objects based on a similarity between associated derived data objects, and select a representative data object for each determined cluster. For example, a similarity matching technique may be applied by using prioritized dimensions of the derived data object as a cue to group objects based on a similarity threshold.

A representative data object may be selected by the clustering module 106 for the determined cluster. In some examples, the clustering module 106 may select a representative derived data object for the determined cluster. In some examples, the representative data object may be one of the constituent data objects in the storage system 102. In some examples, the representative data object may be derived by performing some composition of the individual data objects that captures individual variations within a cluster and their aggregation. In some examples, the representative data object may be derived using representative sections of content from a large representative data object (such as a large log file of sensor readings). In some examples, the representative derived data object may be generated via aggregation of constituent derived data objects.

System 100 includes the representative content selection module 108 to select representative content associated with the storage system, where the representative content is based on the data objects, the derived data objects, and the representative data objects. Generally, the representative content associated with the storage system 102 is any content related to the data objects in the storage system 102 that may be relevant to the analytics application 110. For example, the representative content associated with the storage system 102 may include the representative data objects, thereby reducing data volume. In some examples, the representative content associated with the storage system 102 may include the representative data objects associated with a sub-plurality of the determined clusters. In some examples, the representative content associated with the storage system 102 may include original data objects from the storage system 102. In some examples, the representative content associated with the storage system 102 may include the representative data objects, the derived data objects, and/or representative derived data objects. The representative derived data objects are generally representative data objects associated with the derived data objects.

The representative content selection module 108 relevance optimizes the selected representative content to an analytics application 110. Although the system 100 is described in terms of the analytics application 110, in general, there may be a plurality of analytics applications communicatively linked to system 100. The term "relevance optimize" as used herein, generally refers to representing the data objects in the storage system 102 to a degree of granularity that has an optimal relevance for the analytics application 110. Generally, the representative content selection module 108 selects the representative content to retain as much information of the data objects as possible, so as to be relevant to the analytics application 110, and ensure sufficiently accurate results in response to a query from the analytics application 110. In some examples, system 100 may additionally implement traditional data compaction approaches employed in storage systems (e.g., compression, de-duplication) that may reduce the storage space and transfer sizes. However, as described herein, system 100 may provide relevance optimized representative content to aid analytics consumers by enabling them to avoid wasting computation resources on data objects of low relevance, and speed up an entire analytics workflow (including the volume of intermediate data generated), thereby improving timeliness of actionable insights from the analytics.

In some examples, the relevance optimized representative content may include a maximal representation of the data. Generally, a maximal representation of the data is a representation of the data that may be optimized to conform to storage requirements, and/or data processing requirements. For example, the maximal representation of the data may be a representation of the data that is optimized to conform to storage capacity, processing speed, and so forth. In some examples, the relevance optimized representative content may include an approximate representation of the data. Generally, the approximate representation of the data may not necessarily be a maximal representation. In some examples, the relevance optimized representative content may include the entire data in the storage system 102.

In some examples, the representative content selection module 108 may relevance optimize the selected representative content by modifying the selected representative content. In some examples, the representative content selection module 108 may modify the selected representative content by modifying a similarity threshold for the similarity between associated derived data objects. For examples, the representative content selection module 108 may prompt the clustering module 106 to adjust the similarity threshold in a manner so as to determine new clusters. In some examples, the representative content selection module 108 may modify the selected representative content by modifying features of the derived data object. For example, the data thumbnails of a first sub-plurality of associated data objects may be modified. In some examples, the representative content selection module 108 may modify the selected representative content by varying a sub-collection of features that are utilized to determine similarities. Also, for example, the content summary of a second sub-plurality of associated data objects may be modified. As another example, the analysis summary of a third sub-plurality of associated data objects may be modified. In some examples, the first, second, and/or third sub-plurality of data objects may be identical.

In some examples, the representative content selection module 108 may modify the selected representative content by prompting the clustering module 106 to select another representative object for the determined cluster. For example, the clustering module 106 may substitute a first representative object for a first determined cluster with a second representative object for the first determined cluster. Also, for example, the clustering module 106 may select an additional representative object for the first determined cluster. As another example, the clustering module 106 may adjust the similarity threshold, determine new clusters, and may select new representative objects for the new clusters. In some examples, the representative content selection module 108 may modify the selected representative content by selecting another representative content for the storage system 102.

In some examples, the representative content selection module 108 may relevance optimize the selected representative content by determining a fidelity of the selected representative content, where the fidelity is determined by comparing results of a pre-query run on the selected representative content and on the data objects in the storage system 102, and where the pre-query is based on the analytics application 110. Generally, a pre-query is a test query for which results are already known. Accordingly, running a pre-query on the selected representative content allows the representative content selection module 108 to compare the results derived based on the selected representative content with the known results generated when the pre-query is run on all the data objects of the storage system 102.

In some examples, when the results obtained by running the pre-query on the selected representative content strongly overlap the known results, the selected representative content may be determined to be of high fidelity. In some examples, a quantitative measure may be associated with a comparison of results, and a threshold may be determined, optionally depending on the analytics application 110. Accordingly, when the quantitative measure for the selected representative content is within the predetermined threshold, the selected representative content may be determined to be of acceptable fidelity. Likewise, when the quantitative measure for the selected representative content is not within the predetermined threshold, the selected representative content may be determined to be not of acceptable fidelity.

In some examples, the representative content selection module 108 may determine the fidelity of the selected representative content to be acceptable, and may identify the relevance optimized representative content to be the selected representative content. In some examples, based on such high fidelity to the analytics application 110, the representative content selection module 108 may associate the relevance optimized representative content with the analytics application 110.

In some examples, the representative content selection module 108 may determine the fidelity of the selected representative content to be not acceptable. Accordingly, the representative content selection module 108 may modify the selected representative content until the fidelity of the modified representative content is determined to be acceptable. In some examples, such a process may be performed iteratively until the fidelity of the modified representative content is determined to be acceptable.

In some examples, the representative content selection module 108 may modify the selected representative content based on the fidelity determination. For example, as described herein, the representative content selection module 108 may modify the similarity threshold for the similarity between associated derived data objects. Also, for example, the representative content selection module 108 may modify the selected representative content by modifying features of the derived data object. As another example, the representative content selection module 108 may select another representative object for a determined cluster. Also, for example, the representative content selection module 108 may modify the selected representative content and fine-tune it for higher fidelity to the analytics application 110.

In some examples, the relevance optimized representative content is utilized for a storage management function in the storage system 102. Generally, the storage management function may be any function performed by the storage system 102 to manage the data objects stored in the storage system 102. In some examples, such a storage management function may be performed to manage the data objects in a manner so as to make them more efficiently available for the analytics application 110. In some examples, the storage management function may include tiering, caching, and data protection. In some examples, the storage management function may include storing the relevance optimized representative content in a faster storage device than the other data objects in the storage system 102. Also, for example, the storage management function may include storing the relevance optimized representative content in an enhanced storage device than the other data objects in the storage system 102. In some examples, the storage device may provide different temporal and/or spatial accessibility features for the relevance optimized representative content. For example, the relevance optimized representative content may be stored in a virtual server, and/or a server with enhanced visualization features.

In some examples, the storage management function may include data protection. For example, the storage management function may ensure availability using redundancy (e.g. replication, erasure coding, etc.). Since such data protection mechanisms involve a cost (extra storage space, network 10, etc.), more expensive redundancy schemes may be deployed for the relevance optimized representative content as opposed to the other data objects in the storage system 102.

In some examples, the representative content selection module 108 may provide the relevance optimized representative content in response to a data request from the analytics application 110. For example, when an analytics application 110 requests data from the storage system 102 (typically, by specifying some kind of enumeration or selection criteria for objects or files, e.g. matching directory and/or filename wildcards, all objects belonging to a container or filtered based on meta-data search values), the representative content selection module 108 may identify relevance optimized representative content corresponding to the request. The inputs to the representative content selection module 108 may include the original data objects matching the request, their associated derived data objects, representative data objects and associated representative derived data objects. The representative content selection module 108 typically returns the representative data objects corresponding to the request, but may return original data objects and/or derived data objects depending on the mode of operation or predefined rules. For example, if operating in drill-down or full resolution mode, then the original data objects constitute relevant data. Also, for example, if operating in approximation and/or compaction mode, it is the representative data objects, the derived data objects, and/or the representative derived data objects that may constitute relevant data.

As an illustrative example, consider a storage system 102 that includes large volumes of daily log files generated by various systems over a period of time. In some examples, such log file data may be streaming in continually. Generally, a relative proportion of key events in the log files is consistent over time, and patterns are generally repetitive. Accordingly, on most days, the log files may not include new information. The clustering module 106 may cluster such log files based on similarity of derived data objects, where the derived data objects may include, for example, event histograms. The clustering module 106 may select representative data objects (e.g., representative log files) from the clusters, and the representative content selection module 108 may identify the representative content to be the representative log files. Accordingly, when the storage system 102 is accessed by the analytics application 110 to obtain log data, these representative log files may be provided, and this may be sufficient for a typical analytics application that uses the logs to discover trends, changes and anomalies.

However, in some examples, an actual sequence of events in a log may include crucial information that may not be adequately represented by observing individual event proportions. In such examples, modifying an approximation granularity (e.g. a size or similarity range covered by a cluster) may not increase the fidelity of the representative content. Accordingly, in such examples, the representative content selection module 108 may modify the selected representative content. For example, instead of selecting the representative log file in a cluster, a sequence pattern analysis of all the log files in a cluster may be performed to ensure that the representative log file is augmented to exhibit additional feature variations in the cluster. Such a sequence pattern analysis may be performed, for example, by sampling variations in event sequences found in snippets from other log files in the cluster. Such modified representative content may generally display higher fidelity to the analytics application 110. In some examples, the representative content selection module 108 may provide the modified representative content to the analytics application 110, instead of the previously determined representative content comprising representative log files.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated function.

For example, the data summarization module 104 may be a combination of hardware and programming to identify data objects in the storage system 102 via the processor. Also, for example, the data summarization module 104 may include software programming to generate the derived data object for a data object. In some examples, hardware accelerators and/or indexers may be utilized to generate the derived data objects. As another example, the data summarization module 104 may include software programming to associate derived data objects with data objects, and may include associated hardware to physically store the derived data objects and the determined associations.

Likewise, the clustering module 106 may be a combination of hardware and programming to determine clusters of similar data objects based on a similarity between associated derived data objects. For example, the clustering module 106 may include software programming to automatically determine similarities between derived data objects, and determine the clusters. Also, for example, the clustering module 106 may include software programming to select a representative data object for each determined cluster. The clustering module 106 may include hardware to physically store, for example, the determined clusters, and the representative data objects, and/or representative derived data objects. Also, for example, the clustering module 106 may include a combination of hardware and software programming to dynamically interact with the other components of system 100.

In like manner, the representative content selection module 108 may be a combination of hardware and programming. For example, the representative content selection module 108 may include software programming instructions to select representative content associated with the storage system 102. Also, for example, the representative content selection module 108 may include software programming instructions to relevance optimize the selected representative content to the analytics application 110. The representative content selection module 108 may include a combination of hardware and software programming to dynamically interact with the other components of system 100.

Generally, as described herein, the components of system 100 may include software programming and physical networks to be communicatively linked to other components of system 100. In some instances, the components of system 100 may include a processor and a memory, while programming code is stored and on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
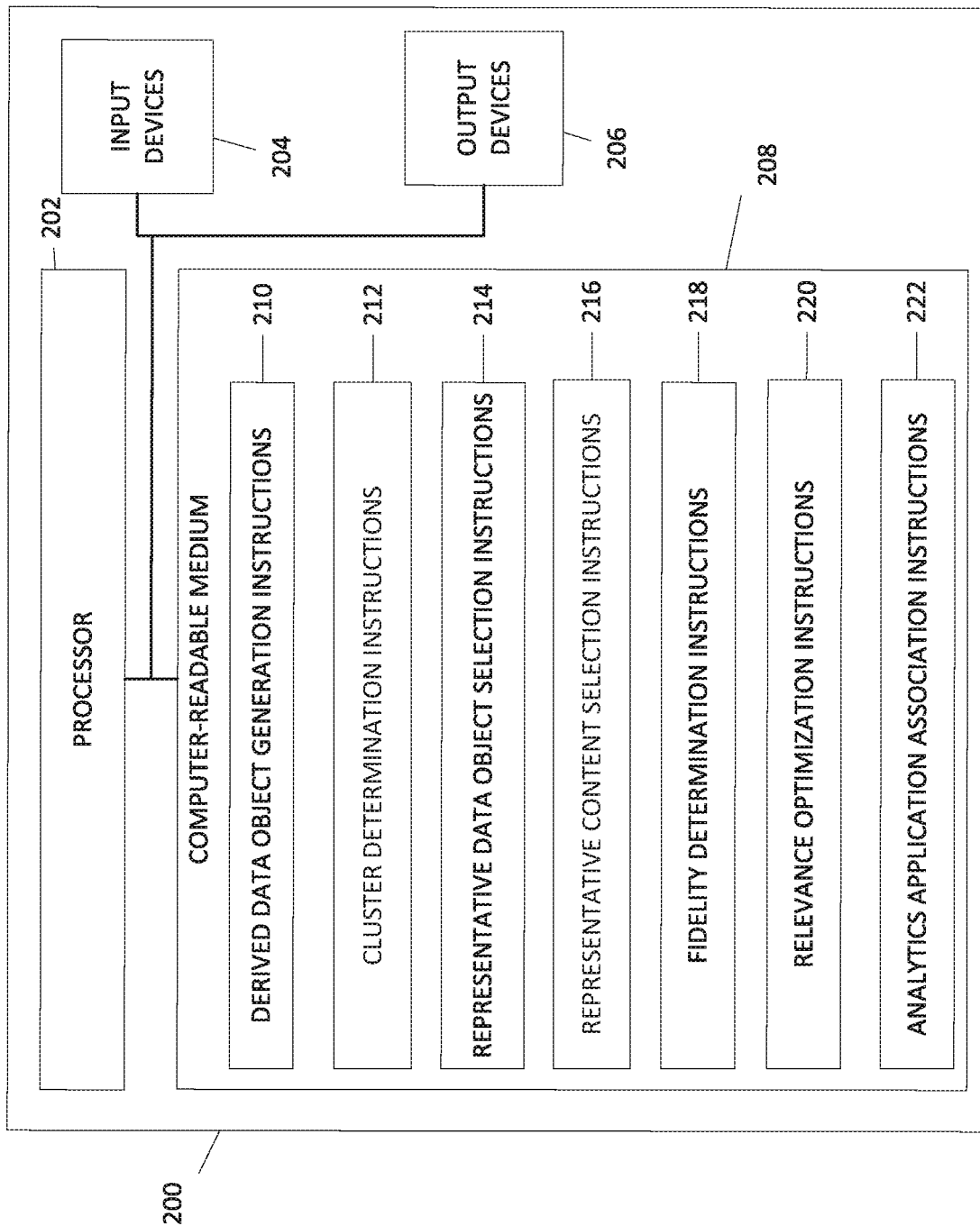
FIG. 2 is a block diagram illustrating one example of a computer readable medium for relevance optimized representative content associated with a data storage system.

FIG. 2 is a block diagram illustrating one example of a computer readable medium for relevance optimized representative content associated with a data storage system. Processing system 200 includes a processor 202, a computer readable medium 208, input devices 204, and output devices 206. Processor 202, computer readable medium 208, input devices 204, and output devices 206 are coupled to each other through a communication link (e.g., a bus).

Processor 202 executes instructions included in the computer readable medium 208. Computer readable medium 208 includes derived data object generation instructions 210 to generate, via the processor 202, a derived data object for each data object in a storage system.

Computer readable medium 208 includes cluster determination instructions 212 to determine, via the processor 202, clusters of similar data objects based on a similarity between associated derived data objects.

Computer readable medium 208 includes representative data object selection instructions 214 to select, via the processor 202, a representative data object for each determined cluster.

Computer readable medium 208 includes representative content selection instructions 216 to select, via the processor 202, a representative content associated with the storage system, wherein the representative content is based on the data objects, the derived data objects, and the representative data objects.

Computer readable medium 208 includes fidelity determination instructions 218 to determine a fidelity of the selected representative content, where the fidelity is determined by comparing results of a pre-query run on the selected representative content, and on the data objects in the storage system, and wherein the pre-query is based on the analytics application.

Computer readable medium 208 includes relevance optimization instructions 220 to relevance optimize the selected representative content to the analytics application by modifying the selected representative content until the fidelity is determined to be acceptable.

Computer readable medium 208 includes analytics application association instructions 222 to associate the relevance optimized representative content with the analytics application.

In some examples, computer readable medium 208 includes instructions to utilize the relevance optimized representative content for storage management functions in the storage system.

Input devices 204 include a keyboard, mouse, data ports, and/or other suitable devices for inputting information into processing system 200. In some examples, input devices 204, such as a computing device, are used to receive data objects, a pre-query, a query, and so forth. Output devices 206 include a monitor, speakers, data ports, and/or other suitable devices for outputting information from processing system 200. In some examples, output devices 206 are used to provide a response to a query.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 208 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 200 are identified and refer to a combination of hardware and programming configured to perform a designated visualization function. As illustrated in FIG. 2, the programming may be processor executable instructions stored on tangible computer readable medium 208, and the hardware may include processor 202 for executing those instructions. Thus, computer readable medium 208 may store program instructions that, when executed by processor 202, implement the various components of the processing system 200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 208 may be any of a number of memory components capable of storing instructions that can be executed by Processor 202. Computer readable medium 208 may be non-transitory in the sense that it does not encompass a transitory signal but instead is made up of one or more memory components configured to store the relevant instructions. Computer readable medium 208 may be implemented in a single device or distributed across devices. Likewise, processor 202 represents any number of processors capable of executing instructions stored by computer readable medium 208. Processor 202 may be integrated in a single device or distributed across devices. Further, computer readable medium 208 may be fully or partially integrated in the same device as processor 202 (as illustrated), or it may be separate but accessible to that device and processor 202. In some examples, computer readable medium 208 may be a machine-readable storage medium.

Figure 3:
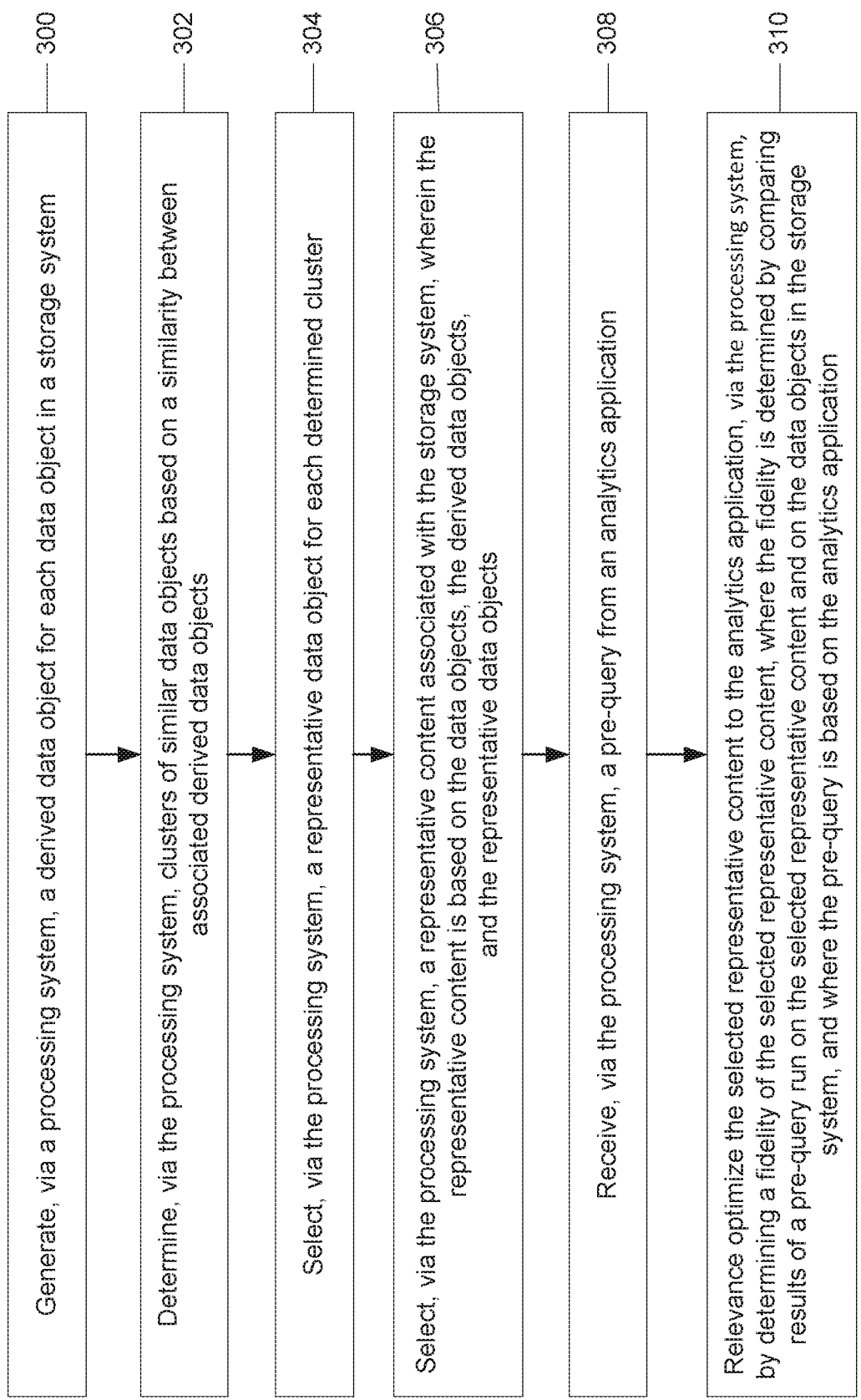
FIG. 3 is a flow diagram illustrating one example of a method for relevance optimized representative content associated with a data storage system.

FIG. 3 is a flow diagram illustrating one example of a method for relevance optimized representative content associated with a data storage system. In some examples, such an example method may be implemented by a system such as, for example, system 100 of FIG. 1.

At 300, a derived data object may be generated for each data object in a storage system.

At 302, clusters of similar data objects may be determined based on a similarity between associated derived data objects.

At 304, a representative data object may be selected for each determined cluster.

At 306, a representative content associated with the storage system may be selected, where the representative content is based on the data objects, the derived data objects, and the representative data objects.

At 308, a pre-query may be received from an analytics application.

At 310, the selected representative content may be relevance optimized to the analytics application, via the processing system, by determining a fidelity of the selected representative content, where the fidelity is determined by comparing results of a pre-query run on the selected representative content and on the data objects in the storage system, and where the pre-query is based on the analytics application.

Figure 4:
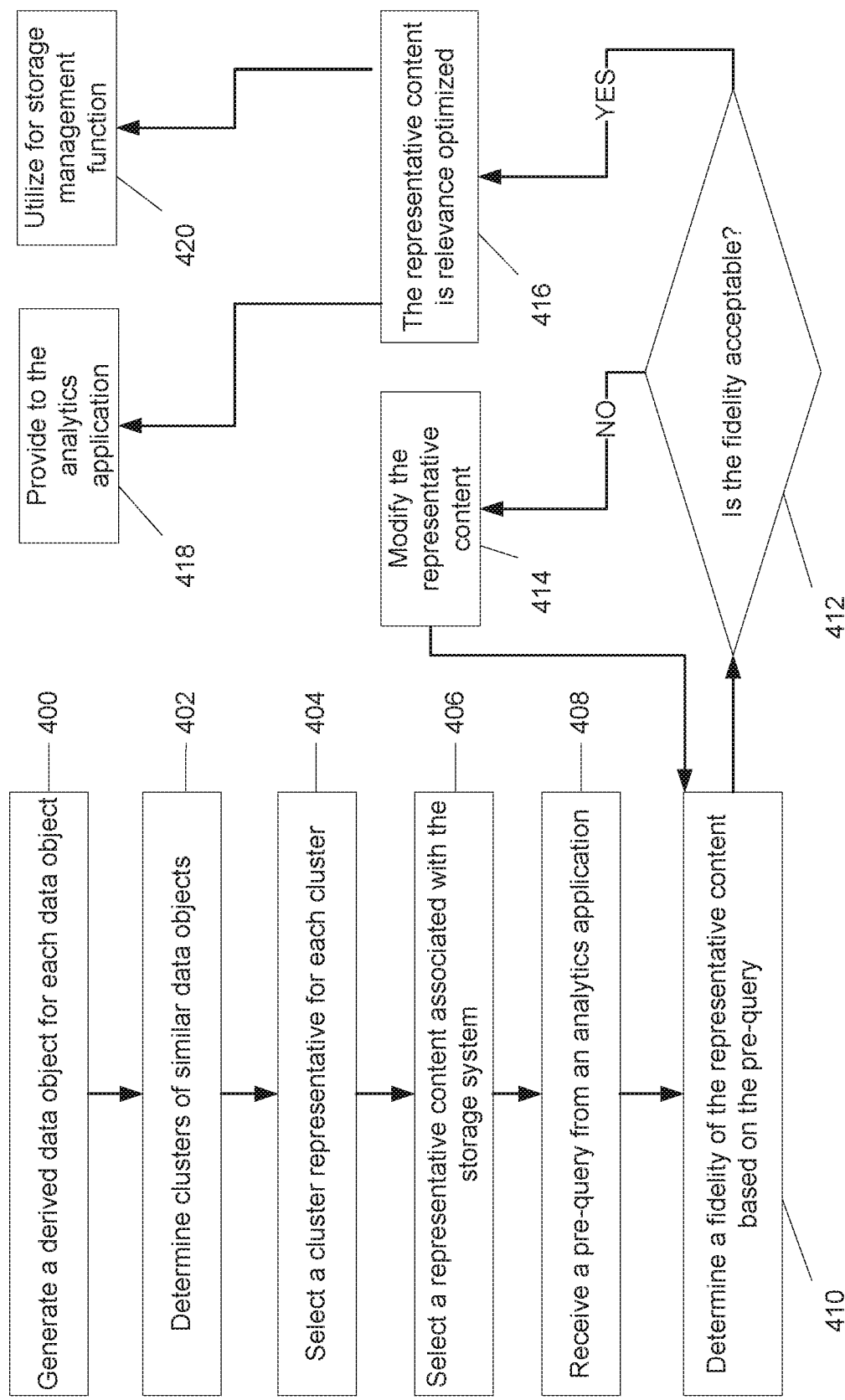
FIG. 4 is a flow diagram illustrating one example of a method for relevance optimized representative content associated with a data storage system based on determining a fidelity of the representative content.

FIG. 4 is a flow diagram illustrating one example of a method for relevance optimized representative content associated with a data storage system based on determining a fidelity of the representative content. In some examples, such an example method may be implemented by a system such as, for example, system 100 of FIG. 1.

At 400, a derived data object may be generated for each data object in a storage system.

At 402, clusters of similar data objects may be determined based on a similarity between associated derived data objects.

At 404, a representative data object may be selected for each determined cluster.

At 406, a representative content associated with the storage system may be selected, where the representative content is based on the data objects, the derived data objects, and the representative data objects.

At 408, a pre-query may be received from an analytics application.

At 410, the selected representative content may be relevance optimized to the analytics application, via the processing system, by determining a fidelity of the selected representative content, where the fidelity is determined by comparing results of a pre-query run on the selected representative content and on the data objects in the storage system, and where the pre-query is based on the analytics application.

At 412, it may be determined if the fidelity of the selected representative content to the analytics application is acceptable.

At 414, upon a determination that the fidelity is not acceptable, the representative content is modified, and at 410, the fidelity of the modified representative content is determined. In some examples, the representative content is iteratively modified until the fidelity of the modified representative content is determined to be acceptable at 412.

At 416, upon a determination that the fidelity is acceptable, the relevance optimized representative content is identified to be the selected representative content.

In some examples, at 418, the relevance optimized representative content is provided in response to a data request from the analytics application.

In some examples, at 420, the relevance optimized representative content is utilized for a storage management function in the storage system. In some examples, the storage management function includes one of tiering, caching, and data protection.

Examples of the disclosure provide a generalized system for relevance optimized representative content associated with a data storage system. The generalized system addresses business challenges of growing costs incurred in data storage, analytic processing and data communications, when data volumes are disproportionately high compared to utility in generating valuable insight. The key proposition is to enable storage systems (such as one that serves a data lake) to aid analytics consumers by providing data of greater information relevance density, thus reducing not just storage space and data transfer volumes, but also improving the speed at which actionable insights are generated, by reducing processing costs incurred by the consumer analytics workload.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a processor; and
a computer readable medium comprising instructions executable by the processor to:
associate each data object in a storage system with a derived data object;
determine clusters of similar data objects based on a similarity between associated derived data objects;
select a representative data object for each determined cluster;
select representative content associated with the storage system, wherein the representative content is based on the data objects, the derived data objects, and the representative data objects;
relevance optimize the selected representative content to an analytics application,
wherein the relevance optimized representative content is utilized for a storage management function in the storage system, and wherein the storage management function includes one of tiering, caching, and data protection.

2. The system of claim 1, wherein the derived data object is one of a data thumbnail of the associated data object, a content summary of the associated data object, and an analysis summary of the associated data object.

3. The system of claim 1, wherein the instructions are executable by the processor to provide the relevance optimized representative content in response to a data request from the analytics application.

4. The system of claim 1, wherein the instructions are executable by the processor to relevance optimize by determining a fidelity of the selected representative content, wherein the fidelity is determined by comparing results of a pre-query run on the selected representative content and on the data objects in the storage system, and wherein the pre-query is based on the analytics application.

5. The system of claim 4, wherein the instructions are executable by the processor to:
determine the fidelity of the selected representative content to be acceptable; and
identify the relevance optimized representative content to be the selected representative content.

6. The system of claim 4; wherein the instructions are executable by the processor to:
determine the fidelity of the selected representative content to be not acceptable;
modify the selected representative content until the fidelity of the modified representative content is determined to be acceptable; and
identify the relevance optimized representative content to be the modified representative content.

7. The system of claim 1, wherein the instructions are executable by the processor to relevance optimize based on modification of the selected representative content, including modification of a similarity threshold for the similarity between associated derived data objects, modification of features of the derived data object, generation of another representative object for a determined duster, or selection of another representative content for the storage system.

8. A method comprising:
generating, via a processing system, a derived data object for each data object in a storage system;
determining, via the processing system, dusters of similar data objects based on a similarity between associated derived data objects;
selecting, via the processing system, a representative data object for each determined cluster;
selecting, via the processing system, a representative content associated with the storage system, wherein the representative content is based on the data objects, the derived data objects, and the representative data objects;

receiving, via the processing system, a pre-query from an analytics application;

relevance optimizing the selected representative content to the analytics application, via the processing system, by determining a fidelity of the selected representative content, wherein the fidelity is determined by comparing results of a pre-query run on the selected representative content and on the data objects in the storage system, and wherein the pre-query is based on the analytics application.

9. The method of claim 8, wherein optimizing the relevance of the selected representative content includes:

determining the fidelity of the selected representative content to be acceptable; and identifying, via the processing system, the relevance optimized representative content to be the selected representative content.

10. The method of claim 8; wherein optimizing the relevance of the selected representative content includes:

determining the fidelity of the selected representative content to be not acceptable;

modifying the selected representative content until the fidelity of the modified representative content is determined to be acceptable; and identifying the relevance optimized representative content to be the modified representative content.

11. The method of claim 8, further comprising providing the relevance optimized representative content in response to a data request from the analytics application.

12. The method of claim 8, further comprising utilizing the relevance optimized representative content for a storage management function in the storage system, and wherein the storage management function includes one of tiering, caching, and data protection.

13. A non-transitory computer readable medium comprising executable instructions to:

generate, via a processor, a derived data object for each data object in a storage system;

determine, via the processor, clusters of similar data objects based on a similarity between associated derived data objects;

select, via the processor, a representative data object for each determined cluster;

select, via the processor, a representative content associated with the storage system, wherein the representative content is based on the data objects, the derived data objects, and the representative data objects;

determine a fidelity of the selected representative content, wherein the fidelity is determined by comparing results of a pre-query run on the selected representative content, and on the data objects in the storage system, and wherein the pre-query is based on an analytics application;

relevance optimize the selected representative content to the analytics application by modifying the selected representative content until the fidelity is determined to be acceptable; and associate the relevance optimized representative content with the analytics application.

14. The non-transitory computer readable medium of claim 13, further comprising instructions to utilize the relevance optimized representative content for a storage management function in the storage system.

* * * * *